US012102505B2

(12) United States Patent
Honour et al.

(10) Patent No.: US 12,102,505 B2
(45) Date of Patent: Oct. 1, 2024

(54) POWER-FIT SINGLE LAYER CAGE

(71) Applicant: OPRO International Limited, Herts (GB)

(72) Inventors: Andrew Honour, Buckinghamshire (GB); Anthony Lovat, Hertfordshire (GB)

(73) Assignee: OPRO INTERNATIONAL LIMITED, Hemel (GB)

( * ) Notice: Subject to any disclaimer, the term of this patent is extended or adjusted under 35 U.S.C. 154(b) by 628 days.

(21) Appl. No.: 17/427,713

(22) PCT Filed: Feb. 10, 2020

(86) PCT No.: PCT/GB2020/050291
§ 371 (c)(1),
(2) Date: Aug. 2, 2021

(87) PCT Pub. No.: WO2020/161503
PCT Pub. Date: Aug. 13, 2020

(65) Prior Publication Data
US 2022/0125560 A1    Apr. 28, 2022

(30) Foreign Application Priority Data

Feb. 8, 2019 (GB) .................................... 1901770

(51) Int. Cl.
*A61F 5/00*  (2006.01)
*A61C 7/08*  (2006.01)
(Continued)

(52) U.S. Cl.
CPC .............. *A61C 9/0006* (2013.01); *A61C 7/08* (2013.01); *A63B 71/085* (2013.01)

(58) Field of Classification Search
CPC .......... A61C 9/0006; A61F 5/566; A61F 5/56; A63B 71/085
See application file for complete search history.

(56) References Cited

U.S. PATENT DOCUMENTS 1,351,108 A    8/1920  Littlejohn
1,367,628 A    2/1921  Roach
(Continued)

FOREIGN PATENT DOCUMENTS

AU    2008221619    4/2009
GB    2581194    8/2020
(Continued)

OTHER PUBLICATIONS

Salvatore, Claudio; International Search Report; Aug. 4, 2020; 2 pages; HV Rijswijk.
(Continued)

*Primary Examiner* — Adam Baker
(74) *Attorney, Agent, or Firm* — STETINA BRUNDA GARRED & BRUCKER (57) ABSTRACT

Apparatus comprising: a holder for receiving a mouldable element and for insertion into a user's mouth to allow the user to apply a biting force to the mouldable element to provide close adaptation to the user's teeth, the holder comprising: opposed sidewalls extending from a base, wherein at least one of the opposed sidewalls is configured to move inwards when the user applies a biting force to the mouldable element received by the holder.

20 Claims, 6 Drawing Sheets

(51) Int. Cl.
*A61C 9/00* (2006.01)
*A63B 71/08* (2006.01)

(56) References Cited

U.S. PATENT DOCUMENTS

| | | | |
|---|---|---|---|
| RE15,265 E * | 1/1922 | Roach | A61C 9/0006 433/46 |
| 2,549,184 A | 4/1951 | Eliot | |
| 4,059,101 A * | 11/1977 | Richmond | A63B 71/085 601/139 |
| 4,127,125 A | 11/1978 | Takemoto et al. | |
| D281,532 S | 11/1985 | Weissman | |
| D328,494 S | 8/1992 | Schwendeman et al. | |
| 5,211,559 A | 5/1993 | Hart et al. | |
| D403,771 S | 1/1999 | Werrin | |
| 6,428,315 B1 * | 8/2002 | Prestipino | A61C 9/0006 433/45 |
| D473,976 S | 4/2003 | Wilkens | |
| D493,578 S | 7/2004 | Manzo et al. | |
| D509,028 S | 8/2005 | Farrell | |
| D525,749 S | 7/2006 | Manzo et al. | |
| D526,093 S | 8/2006 | Manzo et al. | |
| D527,848 S | 9/2006 | Manzo et al. | |
| D537,986 S | 3/2007 | Manzo et al. | |
| D554,259 S | 10/2007 | Diacopoulos et al. | |
| D595,413 S | 6/2009 | Farrell | |
| D663,485 S | 7/2012 | Turkbas et al. | |
| 8,376,738 B2 | 2/2013 | Wagner | |
| D686,327 S | 7/2013 | Marumori et al. | |
| D686,733 S | 7/2013 | Marumori et al. | |
| D706,937 S | 6/2014 | Suga et al. | |
| D708,340 S | 7/2014 | Suga et al. | |
| D734,556 S | 7/2015 | Brett et al. | |
| D743,107 S | 11/2015 | Hirshberg | |
| D795,501 S | 8/2017 | Levine | |
| D862,705 S | 10/2019 | Chen | |
| D874,654 S | 2/2020 | Martone et al. | |
| D880,702 S | 4/2020 | Farrell | |
| D927,696 S | 8/2021 | Kurthy | |
| 2011/0171593 A1 * | 7/2011 | Ross | A61C 9/0006 433/41 |
| 2017/0001095 A1 * | 1/2017 | Lovat | A63B 71/085 |

FOREIGN PATENT DOCUMENTS

| | | | |
|---|---|---|---|
| WO | WO2018/137717 | 8/2017 | |
| WO | WO-2017137717 A1 * | 8/2017 | ........... A61C 9/0006 |

OTHER PUBLICATIONS

Barrett, Anne; Search Report under Section 17; Jun. 26, 2019; 1 page.

* cited by examiner

POWER-FIT SINGLE LAYER CAGE

CROSS-REFERENCE TO RELATED APPLICATIONS

The present application claims priority to PCT International Patent Application No. PCT/GB2020/050291, filed Feb. 10, 2020, and Great Britain Patent Application No. 1901770.6 filed on Feb. 8, 2019, the disclosures of which are incorporated herein by reference.

STATEMENT RE: FEDERALLY SPONSORED RESEARCH/DEVELOPMENT

Not Applicable

BACKGROUND

Technical Field

The invention relates to apparatus for receiving a mouldable element for use in adapting the mouldable element closely to a user's teeth. Specifically, the invention may relate to, but need not be limited to, apparatus for receiving a conformable mouthguard and for fitting the conformable mouthguard to the user's teeth.

Background

A mouthguard is a device worn in the mouth of a wearer and intended to protect the teeth and gums during activity that may risk injury thereto. Typically, mouthguards cover the top teeth and gums and are most often used to prevent injury to areas of the mouth during collisions between athletes in sports such as rugby and hockey. There are various names that may be given to a mouthguard, including gumshield, mouth protector, and mouthpiece.

It is important that a mouthguard fits the wearer's mouth adequately such that when worn it is retained in a correct position in the mouth covering the teeth and gums of the wearer. This is especially important during a sporting event, when sudden motions of an athlete may cause a poorly fitting mouthguard to become dislodged from its fitted position. This can increase the risk of the athlete sustaining an injury to the mouth from a traumatic blow. Furthermore, a mouthguard that is poorly fitting may have to be frequently put back into position in the wearer's mouth or retained in position by the user using their lower jaw or tongue, both of which could cause inconvenience or injury.

Broadly speaking, mouthguards may be split into three categories: custom mouthguards, boil and bite mouthguards and stock mouthguards. Boil and bite mouthguards encompass mouthguards that are conformable in at least one state and may be fitted to a user's mouth after purchase typically through some action by the wearer. Custom mouthguards may be fabricated using impressions, scans or other measurements or information obtained from the eventual intended wearer often by a dental professional. Stock mouthguards encompass mouthguards that are purchased in a preformed shape. Stock mouthguards may be non-customised and/or non-customisable in respect of a wearer's mouth and should therefore fit a user straight "off the shelf".

Boil and bite mouthguards are a type of conformable mouthguard and are typically manufactured from thermoplastic materials allowing a user to immerse the mouthguard in hot water until it becomes soft and pliable. Then the user places it into their mouth and uses their fingers, lips, tongue, cheeks and biting pressure to shape the mouthguard to the contours of their mouth to achieve an improved fit.

However, although there can be an improved fit achieved from the boil and bite mouthguards, there are also disadvantages associated with them. The process of customising boil and bite mouthguards can be time consuming and require significant effort, and the result may not be a well-fitting mouthguard. Furthermore, the results of the process are inconsistent and unreliable.

Custom mouthguards can be produced using an impression or scan of the prospective wearer's teeth and gums which is typically prepared by a dentist or other dental professional. The custom mouthguard is fabricated by a professional onto a model of the teeth made from the impression or scan so that, when it is finished, it fits accurately into the wearer's mouth and is retained in the correct position.

Although custom mouthguards can provide an improved fit within the user's mouth, they may require a dental professional to make an impression of the eventual wearer's teeth and a trained technician then to fabricate the mouthguard. This process can take up to several weeks and can be costly.

Stock mouthguards (also known as ready-made or non-customised mouthguards) are typically manufactured in a preformed shape and are often available to buy in different sizes directly "off the shelf". Stock mouthguards are typically cheaper than customisable mouthguards and are configured to be immediately usable upon purchase. Although stock mouthguards do not have the disadvantages associated with boil and bite and custom mouthguards outlined above, it is likely that they will not fit the wearer's mouth accurately and may not be retained in the correct position.

SUMMARY

According to a first aspect of the invention there is provided apparatus comprising:

a holder for receiving a mouldable element and for insertion into a user's mouth to allow the user to apply a biting force to the mouldable element to provide an impression of or adaptation to the user's teeth, the holder having a base and opposed, sidewalls extending from the base, wherein at least one of the opposed sidewalls includes an articulated finger extending between the base and the sidewall which is moveable inwards at its sidewall part when its base part is moved by a force directed generally parallel to the sidewalls, in order in use, to compress the mouldable element against the user's teeth.

In a further aspect, there is provided a kit of parts comprising a mouldable element, and holder for receiving the mouldable element and for insertion into a user's mouth to allow the user to apply a biting force to the mouldable element to provide an impression of the user's teeth, the holder having a base and opposed, sidewalls extending from the base, wherein at least one of the opposed sidewalls includes an articulated finger extending between the base and the sidewall which is moveable inwards at its sidewall part when its base part is moved by a force directed generally parallel to the sidewalls, in order in use, to compress the mouldable element against the user's teeth.

BRIEF DESCRIPTION OF THE DRAWINGS

Exemplary embodiments of the invention are disclosed herein with reference to the accompanying drawings, in which.

DETAILED DESCRIPTION

Generally disclosed herein are exemplary apparatus configured to receive a mouldable element and compress it onto a user's teeth thus giving an accurate fit. Exemplary apparatus are configured to comprise a compression mechanism that is configured to move one or more sidewalls of the apparatus inwards for compressing the mouldable element against the user's teeth and/or gums. Exemplary apparatus may comprise a compression mechanism configured to translate a biting force applied to the mouldable element by the user into a force exerted by the apparatus on the mouldable element to compress it onto the user's teeth and gums. The apparatus achieves this by translating the biting force of the user into an inward movement of one or more sidewalls of the apparatus.

In this way an accurate adaptation to the user's teeth can be provided with little or no additional effort from the user. Furthermore, there is no skilled professional required to take an impression. Further still, the results obtained by the apparatus are controllable and repeatable.

FIGS. 1a-1e show an exemplary apparatus 100 comprising a holder 104. The holder 104 is configured to receive a mouldable element 106.

The term 'mouldable element' as used herein encompasses any material that can be moulded to a user's teeth and/or gums to provide an imprint of those teeth, for example a conformable (e.g. boil and bite) mouth guard or dental putty.

The holder 104 comprises opposed sidewalls 108 and 110, and a base 112. The opposed sidewalls 108, 110 extend from the base 112. Therefore, the base 112 and the opposed sidewalls 108, 110 of the holder 104 form a channel. In use, a first sidewall 108 corresponds to the palatal/lingual surface of a user's teeth and a second sidewall 110 corresponds to the labial/buccal surface of a user's teeth. That is, the opposed sidewalls 108, 110 are configured to be broadly aligned with the palatal/lingual and labial/buccal surfaces of the user's teeth and the base 112 is configured to be broadly aligned with the occlusal plane or biting surface.

The opposed sidewalls 108, 110 extend along the periphery of the base 112. The opposed sidewalls 108, 110 additionally extend upwards from the base 112. They may be at an angle, such that the opposed sidewalls 108, 110 are divergent from the base 112 or could extend generally vertically at 90 degrees to the base 112.

It is noted that relative terms such as inner, outer, upper, lower, front and back are used herein for descriptive purposes and need not limit the scope of the methods and apparatus disclosed.

The opposed sidewalls 108, 110 are configured such that they are movable inwards. That is, the opposed sidewalls 108, 110 are moveable towards each other, such that they are moveable inwards with respect to the channel formed by the opposed sidewalls 108, 110 and the base 112. This movement allows a mouldable element 106 received within the holder 104 to be compressed against the teeth of the user.

Figure 1A:
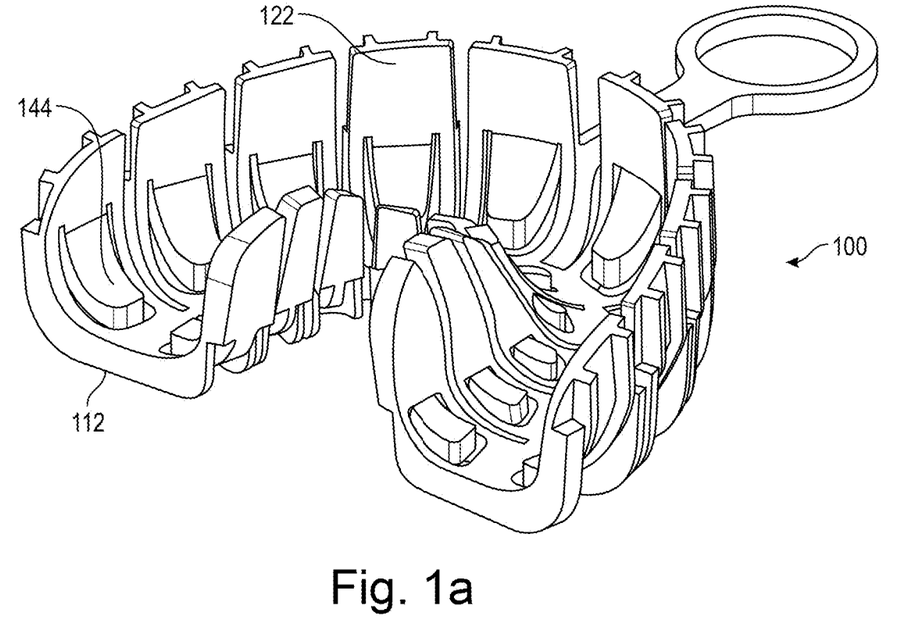
FIG. 1a is a perspective view of apparatus for compressing a mouthguard onto a user's teeth.
Figure 1B:
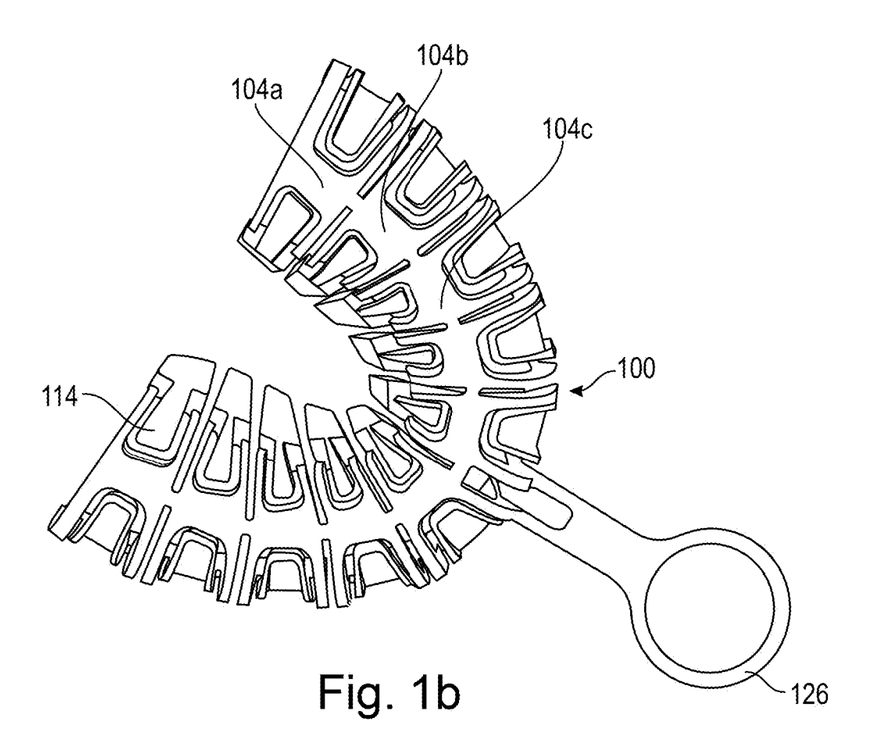
FIG. 1b is a bottom view of apparatus for compressing a mouthguard onto a user's teeth.
Figure 1C:
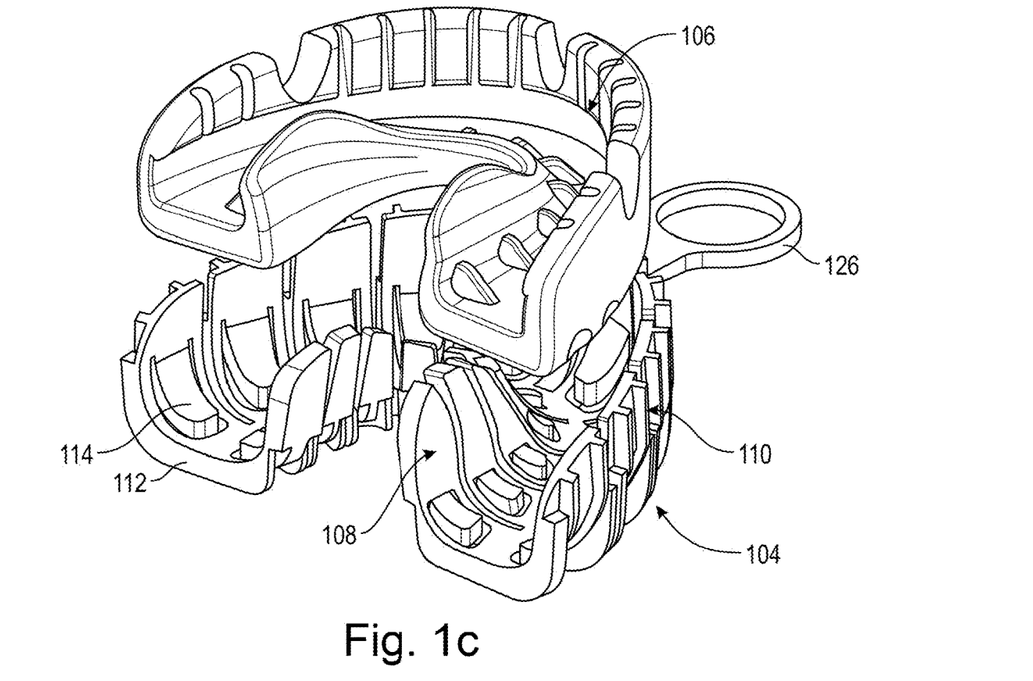
FIG. 1c is a perspective view of apparatus for compressing a mouthguard onto a user's teeth.
Figure 1D:
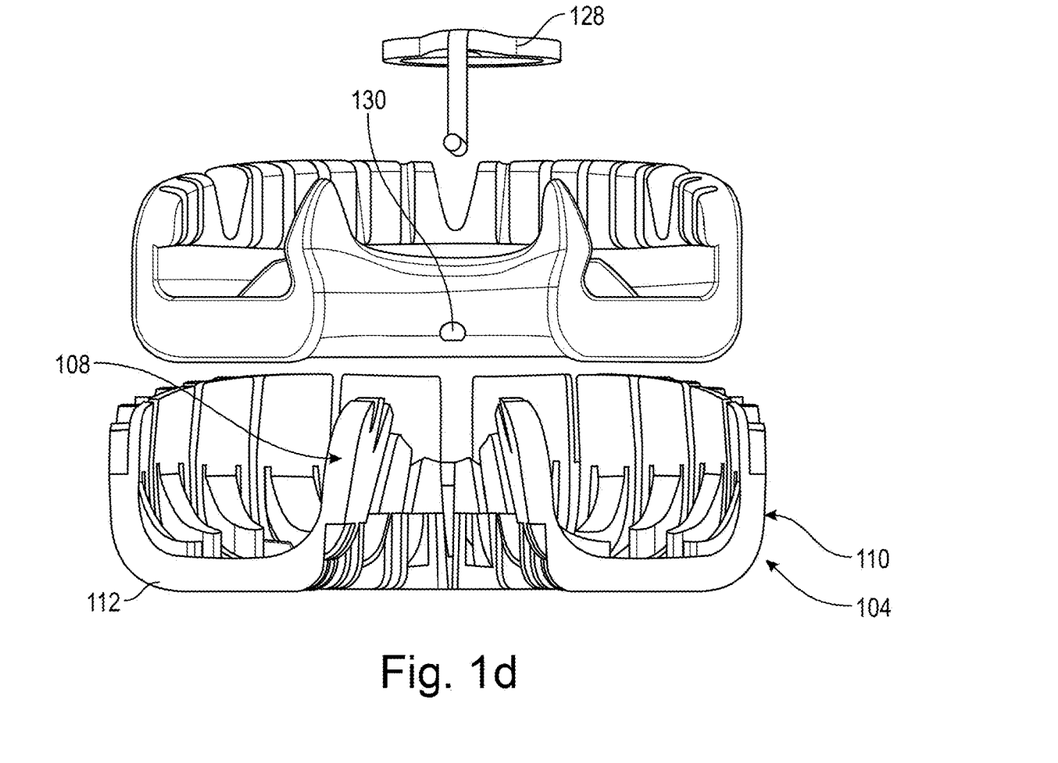
FIG. 1d is a front elevation of apparatus for compressing a mouthguard onto a user's teeth.
Figure 1E:
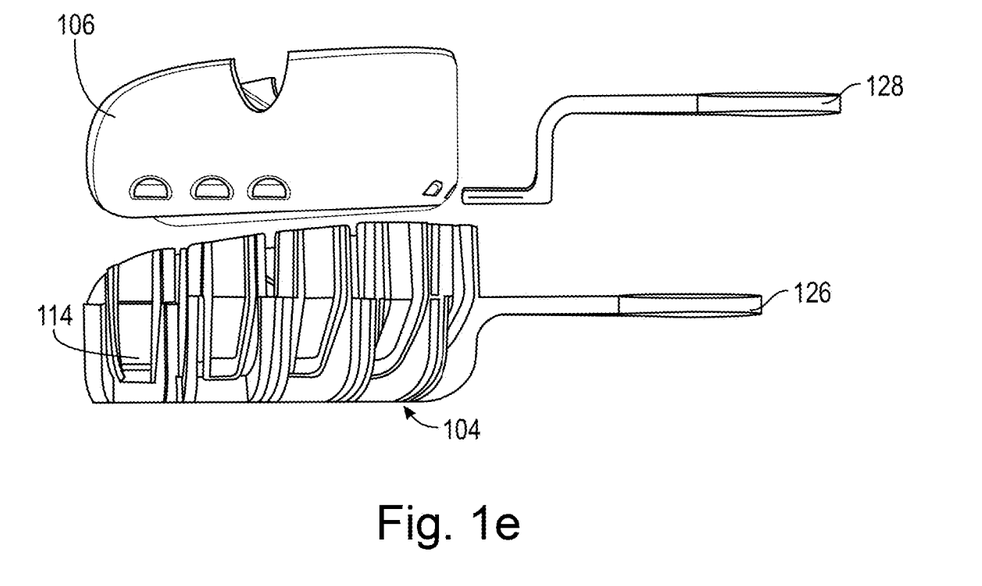
FIG. 1e is a side elevation of apparatus for compressing a mouthguard onto a user's teeth.

In the exemplary apparatus of FIGS. 1a-1c, the opposed sidewalls 108, 110 are flexible such that they may be deflected inwards. This is achieved when a user applies a biting force to the mouldable element 106. When the user removes the biting force the opposed sidewalls 108, 110 may be configured to move outwards.

In exemplary arrangements, the initial state of the opposed sidewalls 108, 110 is at a divergent angle from the base 112. The opposed sidewalls 108, 110 may be deflected inwards under a force and return to the resting state when the force is removed.

The opposed sidewalls 108, 110 and the base 112 form a channel within which the mouldable element 106 is received. The width of the channel is sufficient to allow reception of the mouldable element 106. The width of the channel is further sufficient such that the sidewalls of the mouldable element 106 after use of the apparatus have a width sufficient for the intended purpose of the mouldable element. That is, if the mouldable element is a conformable mouthguard then the width of the walls must be sufficient to provide adequate shock absorption, and if the mouldable element is for casting a model of the user's teeth then the width of walls must be sufficient to provide structural integrity for that purpose.

The holder 104 forms a compression mechanism configured to move the opposed sidewalls 108, 110 inwards, as described in more detail below.

In use, the user places the apparatus 100, comprising the holder 104 and the mouldable element 106 into their mouth using a handle 126. When the user applies a biting force to the mouldable element 106 received by the holder 104, the mouldable element 106 and holder 104 are compressed between the biting surfaces of the upper and lower teeth of the user. This has the effect of compressing the base 112 of the holder 104.

The mouldable element 106 may also be manipulated using a handle 128 which is engageable with an aperture 130 defined in the element 106.

Figure 2A:
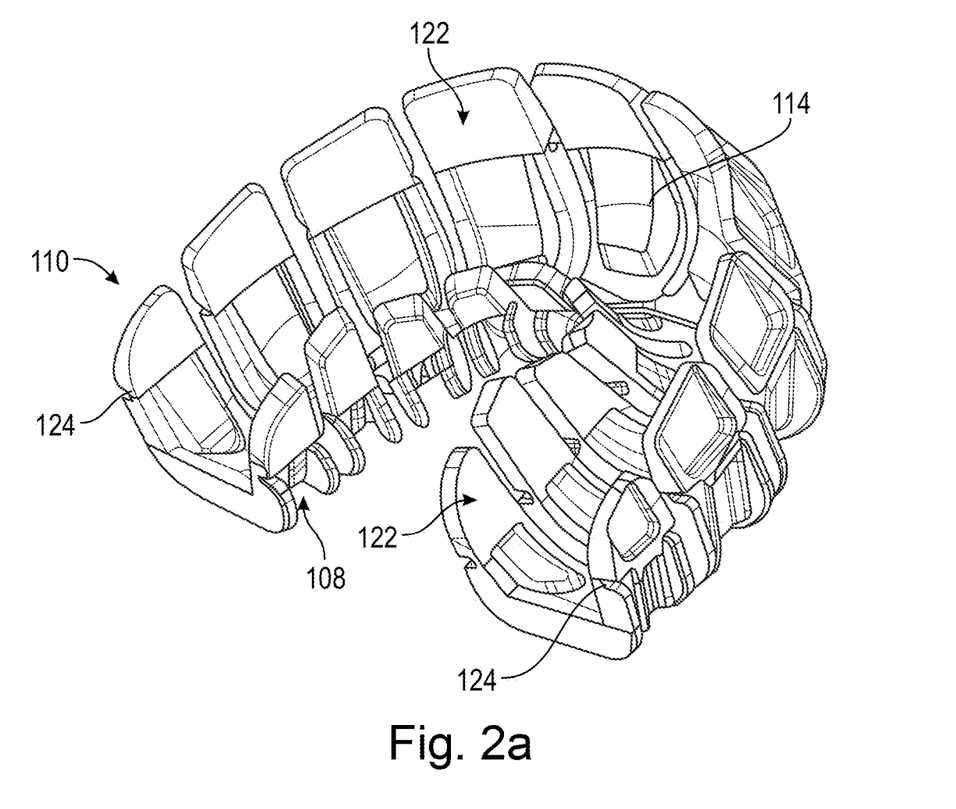
FIG. 2a is a perspective view of a holder for compressing a mouthguard onto a user's teeth.
Figure 2B:
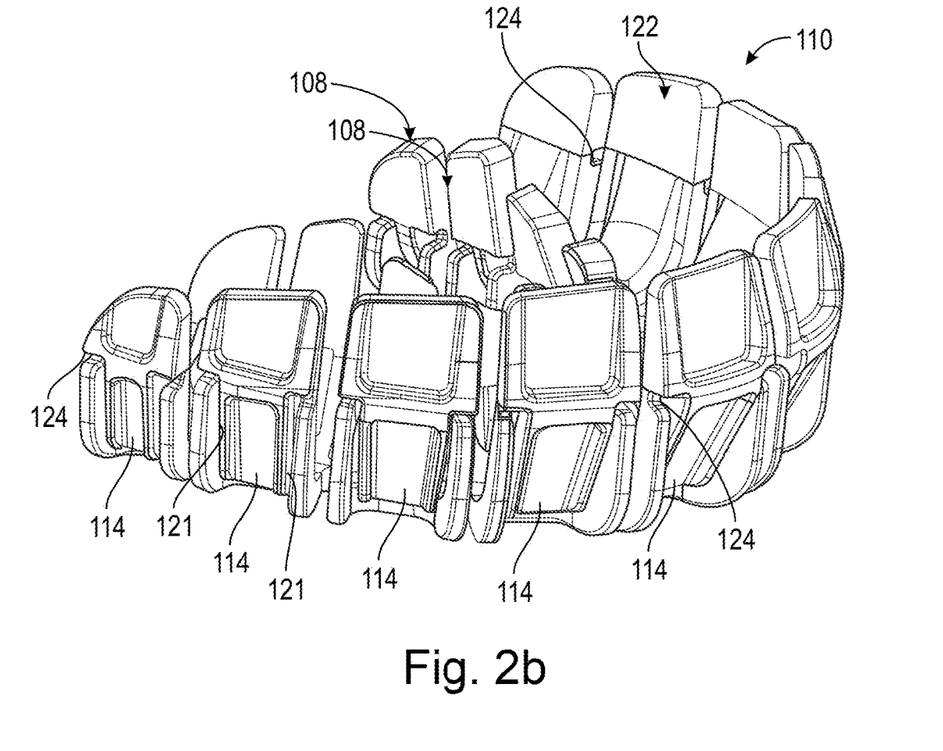
FIG. 2b is a perspective view of a holder for compressing a mouthguard onto a user's teeth.
Figure 2C:
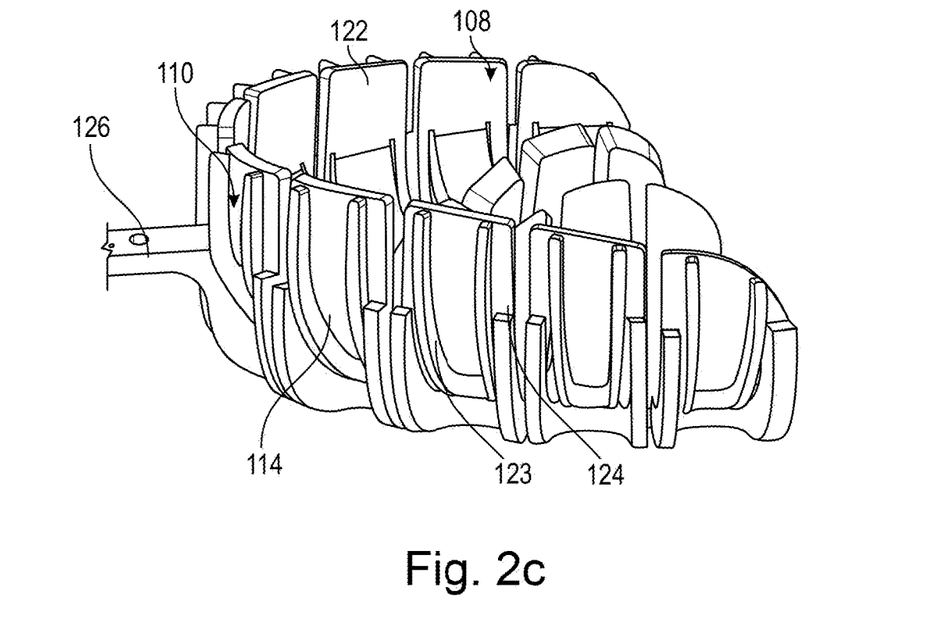
FIG. 2c is a perspective view of a holder for compressing a mouthguard onto a user's teeth.
Figure 3A:
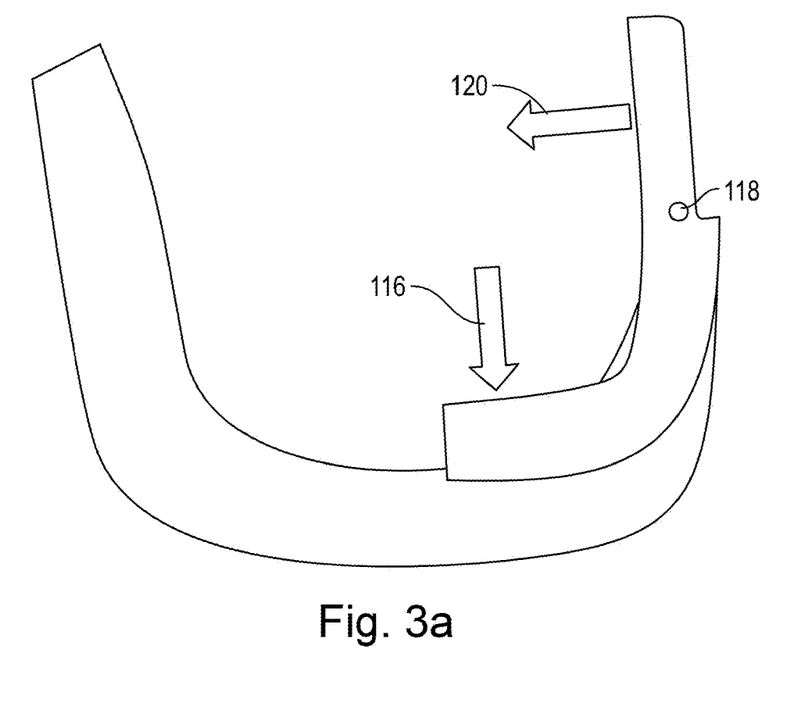
FIG. 3a is a schematic section through apparatus for compressing a mouthguard onto a user's teeth.
Figure 3B:
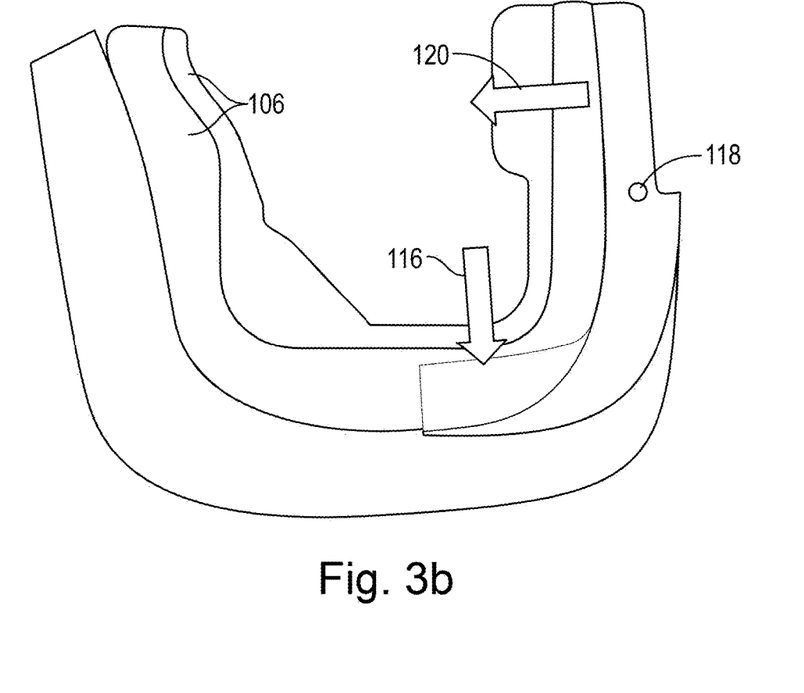
FIG. 3b is a schematic section through apparatus for compressing a mouthguard onto a user's teeth.

With reference to FIGS. 2a-2c, the holder side walls 108,110 are formed with a plurality of hinged fingers 114 which extend from the upper parts of the sidewalls from an area which corresponds to a user's gums when the holder and mouldable element are in place in a user's mouth, down into the lower parts of the holder at least partially across the base 112 of the holder 104. Thus the fingers 114 in side profile, have a generally L-shaped configuration as shown for example, in FIGS. 3a-3c. Optionally only one side-wall (either 108 or 110) may be provided with hinged fingers. The description below assumes that both side-walls have hinged fingers 114.

The fingers 114 are hinged part-way up the side walls so that downward forces 116 in the base region 112 from biting, are translated by rotation of the fingers about the respective hinges 118, into inward compressive forces 120 around the gum area of the user when the holder 104 is in use. Beneath the hinged portion, the fingers 114 are separated from the bulk of the sidewalls 108, 110 with generally vertical slots 121.

Figure 3C:
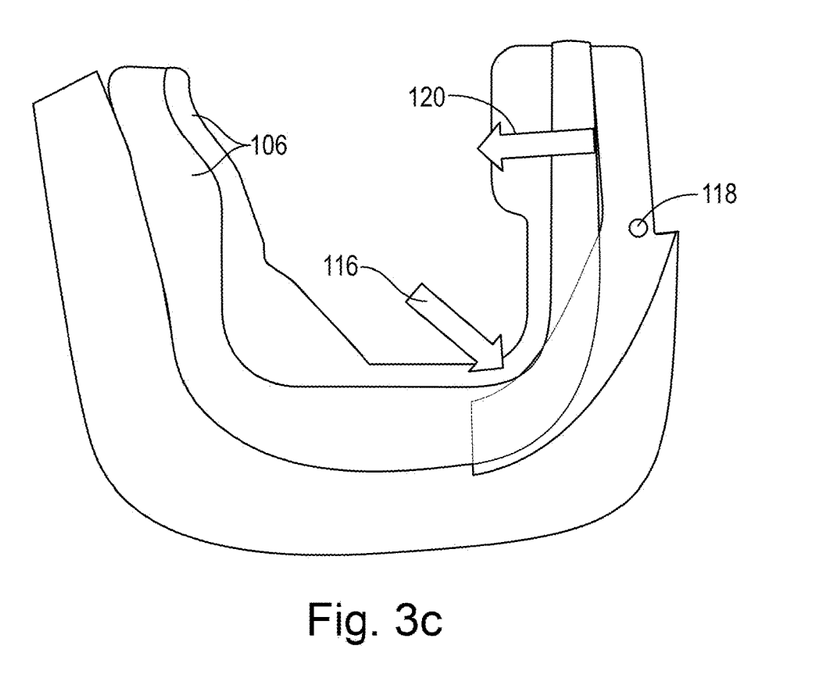
FIG. 3c is a schematic section through apparatus for compressing a mouthguard onto a user's teeth.

By variation of the shape and position of the lower parts of the fingers 114 and the position of the hinges 118, different force multiplications (by varying the lever effect of the fingers 114) and motion of the upper part of the fingers 114 may be achieved and these shapes and positions may be selected by the skilled person to achieve a desired force profile around the users gum area and at different positions around the holder 104. A different variation is shown in FIG. 3*c* as compared to FIGS. 3*a* and 3*b*, by way of example, with a shortened lower portion of the finger 114.

Also, respective pressure pads 122 on the fingers 114, which are formed in the upper area of the fingers, above the hinges 118, correspond with a position at which in use, pressure is applied around a user's gum regions (via a mouldable element 106). These pads 122 may be shaped to apply pressure in a desired way. In the preferred embodiment, there are approximately the same number of fingers in the walls 108, 110 and thus the fingers in the outer side wall 110 are wider to accommodate the greater circumference of the outer wall. These wider pads are supported by strengthening ribs 123 which run generally parallel (vertically in use) with the fingers, either side of the hinges 114. Preferably, each finger has a pair of such ribs 123, near the outer vertical edges of the fingers. This type of strengthening rib can be applied to any of the fingers in either side wall, and depends on the flexibility of the materials used, and the amount of acceptable flex in the fingers, consistent with transmitting biting forces into the users gum area.

Preferably, the hinged regions are formed by thin connecting portions which connect the fingers with the bulk of side walls 108, 110. These connecting portions 124, elastically deform in use, to allow the fingers a small degree of rotation under biting force and return approximately to their unforced position after the biting force is released to allow separation of the mouldable element from the holder 104. These connecting portions may be formed by moulding small notches in the outer face of the holder 104 at the upper ends of the slots 121.

The inward deflection of the holder opposed sidewalls 108, 110 by movement of the plurality of fingers 114, results in a compression of the mouldable element 106 against the palatal/lingual and labial/buccal surfaces of the users teeth. The inwards deflection of the holder opposed sidewalls 108, 110, and therefore the compression of the mouldable element 106 towards the user's teeth, continues until the user reduces the biting force.

The user then removes the biting force. The user then removes the entire assembly from their mouth and extracts the mouldable element 106, now including an impression of the user's teeth, from the holder 104.

Alternatively, other arrangements may be used to deflect the holder opposed sidewalls 108, 110. Furthermore, it is noted that the apparatus disclosed herein may be configured to provide impressions of the upper and/or lower teeth of the user.

It can be seen in FIGS. 1*a* and 1*b* that the holder 104 may be articulated. This allows the holder 104 to shape to an arch of the user's teeth. This will occur automatically when the user places their teeth in a mouldable element 106 received within the holder 104 as the articulated nature of the holder will naturally conform to the user's arch.

The holder 104 comprises a plurality of articulated sections 104*a-c* (only three sections are referenced, although the description herein may apply to more than three). The exemplary apparatus 100 comprises eleven articulated sections 104*a-c*, but other numbers of sections are possible. The number of articulated sections shown in FIGS. 1*a* and 1*b* is not limiting, and exemplary apparatus may comprise any number of articulated sections. Each of the plurality of articulated sections 104*a-c* are connected by a joint about which adjacent articulated sections 104*a-c* may be rotated relative to each other. The joints may comprise an elongate section of material that is flexible to articulate the sections 104*a-c*. The joint may comprise an elongate plastically or elastically deformable material. The joints may together form a spine along the holder base 112. In exemplary apparatus, the holder 104 is completely manufactured from a plastically and/or elastically deformable material.

The articulated sections 104*a-c* are configured such that the holder 104 is able to fit to the unique arch of a user's teeth. In this way the apparatus 100 is suitable for a variety of users.

The articulated sections 104*a-c* are configured such that the spacing between each individual articulated section 104*a-c* at inner and outer peripheries are variable. The inner periphery corresponds to the palatal or lingual surface of a user's teeth, while the outer periphery corresponds to the buccal surface of a user's teeth.

In the exemplary apparatus 100, the spacing between each articulated section 104*a-c* is equal when the holder 104 is in the resting position. In other words, in the rest position the distance between each articulated section 104*a-c* at the inner periphery is equal, and the distance between each articulated section 104*a-c* at the outer periphery is equal. Furthermore, the distance between each articulated section 104*a-c* may be the same at the inner periphery and at the outer periphery when the holder 104 is in the resting position.

The separation between the articulated sections 104*a-c* at the inner and outer peripheries may be configured such that the mouldable element does not escape between the articulated sections 104*a-c* when the holder opposed sidewalls 108, 110 are moved inwards. In other arrangements, for example those configured for use with dental putty, the separation between the articulated sections 104*a-c* at the inner and outer peripheries may be configured to allow some bulging of the mouldable element between the articulated sections 104*a-c* when the holder opposed sidewalls 108, 110 are moved inwards. The separation between the articulated sections 104*a-c* at the inner and outer peripheries may be configured based on the material used for the mouldable element, and in exemplary arrangements may be in a range from 0.5 mm to 2.5 mm, or in a range from 1 mm to 2 mm.

To account for the tighter radius of the apparatus at the inner periphery compared with the outer periphery, the articulated sections 104*a-c* are tapered towards the inner periphery to maintain equal spacing.

The holder 104 comprises a plurality of articulated sections 104*a-c*. The articulated sections 104*a-c* of the holder 104 operate in the same way as the articulated sections 104*a-c* of the holder 104. It can be seen from FIG. 1*b* that each of the plurality of holder articulated sections 104*a-c* is received by a corresponding articulated section 104*a-c* of the holder 104. As such, a deflection of each of the plurality of articulated sections 104*a-c* of the holder 104 results in a deflection of each of the corresponding articulated sections 104*a-c* of the holder 104.

When the apparatus 100 is in use (i.e. when the holder 104 receives a mouldable element 106 and the user's teeth) each articulated section 104*a-c* of the holder 104 may deflect about the joint such that the spacing between each articulated section may reduce or increase depending on the arch of the individual user's teeth.

The articulated sections 104*a-c* are 'discrete' from each other in that they are separate from each other and are separably operable. The term 'discrete' is used in this document to encompass a situation wherein elements have independent operation and/or movement, although they may be joined. Preferably, the articulated sections comprise discrete inner sections and discrete outer sections, and wherein there are fewer discrete inner sections than discrete outer sections to maintain equal spacing.

The holder opposed sidewalls 108, 110 are the same height, although in other arrangements they may be different heights.

The holder opposed sidewalls 108, 110 of each articulated section 104*a-c* are individually moveable inwards. That is, each holder opposed sidewalls 108, 110 of each articulated section 104*a-c* may be deflected inwards independently. Accordingly, the holder opposed sidewalls 108, 110 of one or more articulated sections 104*a-c* of the holder 104 may be configured to apply a different inward force to the holder opposed sidewalls 108, 110 of one or more other articulated sections 104*a-c*. Therefore, the holder opposed sidewalls 108, 110 may be configured to apply a different inward pressure at different locations. For example, this may be done by varying the width of the holder channel, or by varying the height of the holder opposed sidewalls 108, 110.

Figure 4:
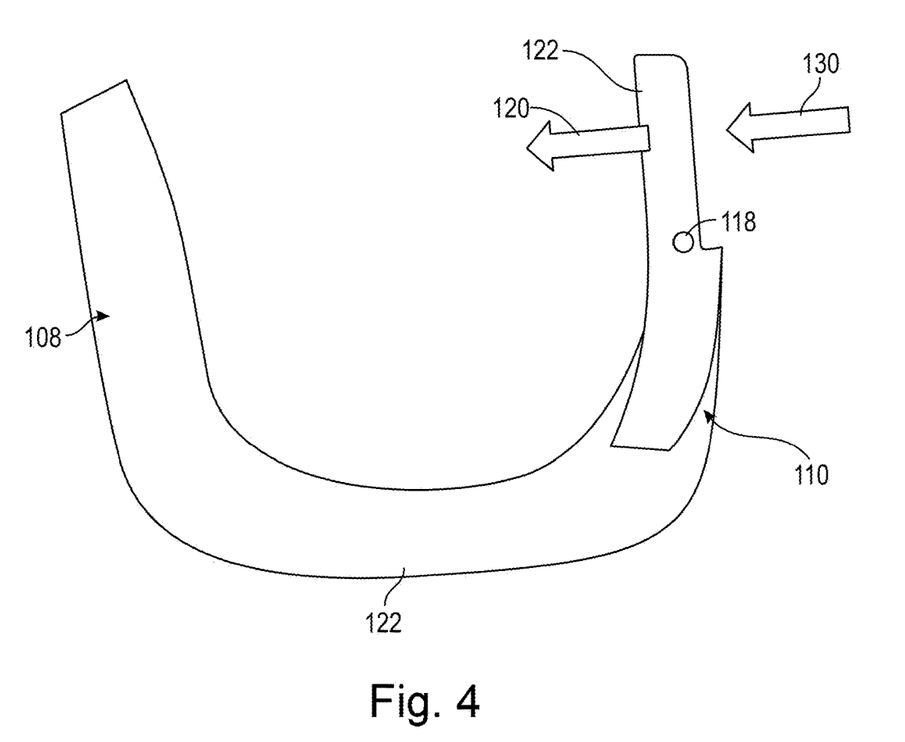

In a further embodiment as shown in FIG. 4, the inward compressive forces 120 may be created directly by a user applying a force 130 through their lips, or directly, to the outer faces of the pressure pads 122. In this case, the pressure pads 122 in the side wall 108 are far more effective at spreading the force evenly, and thereby achieving a better result for the fit of the mouldable element 106, than applying directly to the mouldable element without the force being transmitted by the pads 122. In this embodiment, the fingers either do not extend into the base 112 (so are generally linear and not L-shaped) or are arranged to be below the level of the rest of the base 112 so that biting forces are generally not applied to the fingers in use. This embodiment may have similar features in other respects, to the other embodiments described above.

The skilled person will be able to envisage further embodiments without departing from the scope of the appended claims.

The invention claimed is:

1. An apparatus comprising:
a holder for receiving a mouldable element and for insertion into a user's mouth to allow the user to apply a biting force to the mouldable element to provide an impression or adaptation of the user's teeth, the holder having, a holder base and opposed, holder sidewalls extending from the holder base,
wherein at least one of the opposed holder sidewalls includes an articulated finger having a finger sidewall part that forms part of the holder sidewall and a finger base part that forms part of the holder base and which is moveable inwards at the finger sidewall part when the finger base part is moved by a force directed generally parallel to the holder sidewalls, in order in use, to compress the mouldable element against the user's teeth, and wherein the finger is hingeably connected at its sidewall part to the holder sidewall at a position part-way up the holder sidewall so that downward forces directed into the finger base part from biting, are translated by rotation of the finger about the hinge, into inward compressive forces at the gum area of the user when the holder is in use.

2. The apparatus according to claim 1, wherein the finger extends from the parts of the sidewalls from an area which corresponds to a user's gums when the holder and mouldable element are in place in a user's mouth, to a position at least partially across the base of the holder.

3. The apparatus according to claim 1, wherein the finger in side profile, has a generally L-shaped configuration.

4. The apparatus according to claim 1, wherein the part of the finger on the side of the hinge nearest the base, is separated from the bulk of the sidewall with slots.

5. The apparatus according to claim 1, wherein the hinge is formed by thin connecting portions which connect the finger with the bulk of the side wall.

6. The apparatus according to claim 5, wherein the connecting portions are thinned by moulding notches in the outer face of the holder at the upper ends of the slots.

7. The apparatus according to claim 1, including a pressure pad on the finger, which is formed at the end of the finger remote from the holder base, and which corresponds with a position at which in use, pressure is applied around a user's gum regions via a mouldable element.

8. The apparatus according to any preceding claim including a plurality of fingers.

9. The apparatus according to claim 1, wherein the holder is articulated for shaping the holder to fit an arch of the user's teeth.

10. The apparatus according to claim 9, wherein the holder comprises a plurality of discrete articulated sections.

11. The apparatus according to claim 10, wherein the articulated sections are equally spaced.

12. The apparatus according to claim 11, wherein the base of each articulated section is tapered to maintain equal spacing.

13. The apparatus according to claim 12, wherein the articulated sections comprise discrete inner sections and discrete outer sections, and wherein there are fewer discrete inner sections than discrete outer sections to maintain equal spacing.

14. The apparatus according to claim 11, wherein the articulated sections comprise discrete inner sections and discrete outer sections, and wherein there are fewer discrete inner sections than discrete outer sections to maintain equal spacing.

15. The apparatus according to claim 10, wherein the articulated sections comprise discrete inner sections and discrete outer sections, and wherein there are fewer discrete inner sections than discrete outer sections to maintain equal spacing.

16. The apparatus according to claim 1, wherein the mouldable element that the holder is configured to receive is one of a boil and bite mouthguard and a dental impression material.

17. The apparatus according to claim 1, further comprising the mouldable element.

18. A kit of parts comprising:
a mouldable element, and
a holder for receiving the mouldable element and for insertion into a user's mouth to allow the user to apply a biting force to the mouldable element to provide an impression of the user's teeth, the holder having:
a holder base and opposed, holder sidewalls extending from the holder base,
wherein at least one of the opposed holder sidewalls includes an articulated finger having a finger sidewall part that forms part of holder the sidewall and a finger base part that forms part of the holder base and which is moveable inwards at its finger sidewall part when the finger base part is moved by a force directed generally parallel to the holder sidewalls, in order in use, to compress the mouldable element against the user's teeth, and wherein the finger is hingeably connected at its sidewall part to the holder sidewall at a position part-way up the holder sidewall so that downward forces directed into finger the base part from biting, are translated by rotation of the finger about the hinge, into inward compressive forces at the gum area of the user when the holder is in use.

19. An apparatus comprising:
a holder for receiving a mouldable element and for insertion into a user's mouth to allow the user to apply a force to the mouldable element by the user applying a force through their lips, or directly, to the outer face of the holder, in order to provide an impression or adaptation of the user's teeth, the holder having, a holder base and opposed, holder sidewalls extending from the holder base,
wherein at least one of the opposed holder sidewalls includes an articulated finger having a finger sidewall part that forms part of the holder sidewall and which is moveable inwards at the finger sidewall part when moved by a force directed generally parallel to the holder base, in order in use, to compress the mouldable element against the user's teeth, and wherein the finger is hingeably connected at its sidewall part to a holder sidewall at the position part-way up the holder sidewall so that forces directed into the finger are translated and controlled by rotation of the finger about the hinge, into inward compressive forces at the gum area of the user when the holder is in use.

20. A kit of parts comprising:
a mouldable element, and
a holder for receiving the mouldable element and for insertion into a user's mouth to allow the user to apply a force to the mouldable element by the user applying a force through their lips, or directly, to the outer face of the holder, in order to provide an impression of the user's teeth, the holder having:
a holder base and opposed, holder sidewalls extending from the holder base,
wherein at least one of the opposed holder sidewalls includes an articulated finger having a finger sidewall part that forms part of the holder sidewall and which is moveable inwards at its finger sidewall part when its finger base part is moved by a force directed generally parallel to the holder base, in order in use, to compress the mouldable element against the user's teeth, and wherein the finger is hingeably connected at its sidewall part to the holder sidewall at a position part-way up the holder sidewall so that forces directed into the finger, are translated and controlled by rotation of the finger about the hinge, into inward compressive forces at the gum area of the user when the holder is in use.

* * * * *